United States Patent [19]

Arnold

[11] Patent Number: 5,045,692

[45] Date of Patent: Sep. 3, 1991

[54] SIMULTANEOUS FLUID FLOW AND FLUID DENSITY MEASUREMENTS USING ROTAMETER AND NUCLEAR TECHNOLOGY

[75] Inventor: Dan M. Arnold, Katy, Tex.

[73] Assignee: Halliburton Logging Services, Inc., Houston, Tex.

[21] Appl. No.: 483,499

[22] Filed: Feb. 22, 1990

[51] Int. Cl.$^5$ .............................................. G01V 5/08
[52] U.S. Cl. .................................. 250/266; 250/256; 250/260; 250/356.2
[58] Field of Search ................... 250/356.1, 356.2, 256, 250/266, 260; 73/155

[56] References Cited

U.S. PATENT DOCUMENTS

| | | | |
|---|---|---|---|
| 2,714,168 | 7/1955 | Hencke et al. | 250/356.2 |
| 2,783,646 | 3/1957 | Rumble | 73/155 |
| 3,401,260 | 9/1968 | Holm et al. | 250/356.2 |

Primary Examiner—Carolyn E. Fields
Attorney, Agent, or Firm—William J. Beard

[57] ABSTRACT

A fluid flow and simultaneous fluid density measuring device is set forth. The preferred embodiment incorporates a sonde having a lower inlet port, an upper outlet port, a lengthwise tube extending through the sonde and connected with the ports. A packer provides external isolation to direct all fluid flow into the tube. A float within the tube is buoyantly raised primarily as a function of fluid velocity and fluid density, and the position of the float is measured by placing a radioactive source in the float and measuring the count rate at spaced detectors to ascertain float location. Fluid is simultaneously measured by determining the radiation count rate attenuation of the fluid. With other fixed parameters and measurement of the float position and fluid density, the fluid flow rate can be determined. Both method and apparatus are set forth.

14 Claims, 1 Drawing Sheet

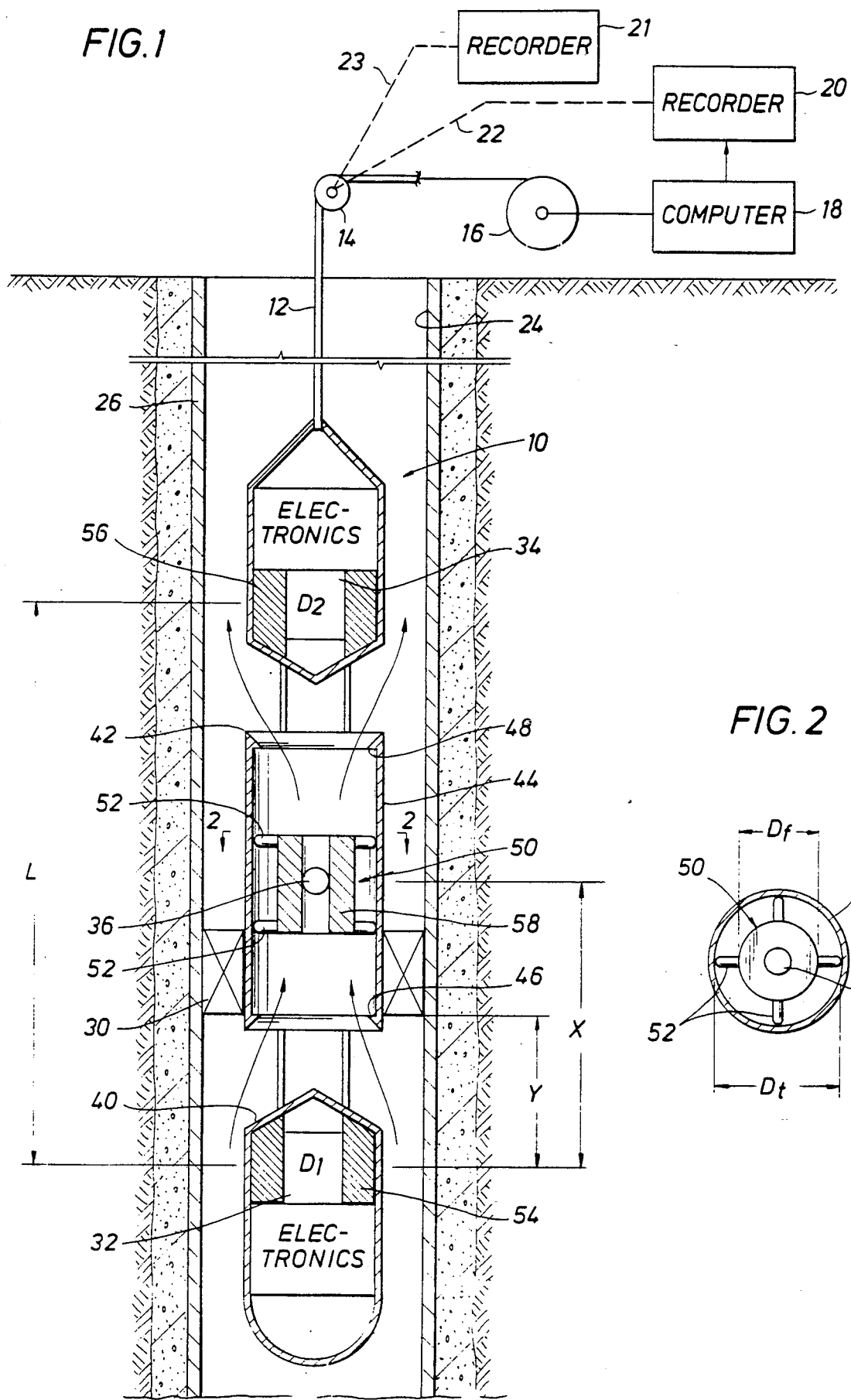

5,045,692

SIMULTANEOUS FLUID FLOW AND FLUID DENSITY MEASUREMENTS USING ROTAMETER AND NUCLEAR TECHNOLOGY

BACKGROUND OF THE DISCLOSURE

The present disclosure is directed to a simultaneous fluid flow and fluid density measurement device. It is a device which is adapted to be suspended in a well borehole, typically a cased well, and in a well which is producing fluid which flows through the well to the surface. The system can be temporarily or permanently installed at a location. If permanent, a communication line from the device is installed which extends to the surface, or the data can be recorded within the device with a "memory gauge," and retrieved when the device is eventually removed from the well borehole. This eliminates the need to install a line to the surface.

In ordinary usage to determine oil and gas production from various zones. the device is lowered to a particular depth in the borehole on a logging cable having one or more electrical conductors therein. In most cases the fluid is flowing upward within the well bore; therefore, the fluid flows upward through the device. For purposes of illustration, assume that a packer is inflated to insure that all fluid flows through the device. The device can be used without a packer if it is assumed that the flow through the device is representative of the total flow within the borehole. The device can even be moved continuously upward within the well bore, so long as the linear velocity of the fluid exceeds the linear velocity of the device. The apparent flow through the device can be converted to actual flow through the device if the linear velocity of the device is measured.

The fluid is directed through an inlet port at the bottom of a tool containing the measuring device, flows upwardly through a vertical tube, and emerges at an outlet port at the top of the tool. The fluid moves a float within an axially positioned tube which slides or traverses the tube between inlet and outlet ports. The flotation or position of the float within the tube is, for a given float mass and cross sectioned area, dependent primarily upon the flow rate and the density of the fluid.

In the preferred embodiment, a radioactive source is installed in the float. One example is isotope 137 of cesium which emits gamma radiation. First and second radioaction responsive gamma ray detectors are included in the tool. They are located at respective ends of the tube. One is at the inlet and the other at the outlet, both supported by the elongated tool body which supports and defines the present structure.

The source-detector technique is used to (1) determine the position of the float within the tool and (2) to determine the density of the fluid. Both of these parameters are required to determine the volume flow rate through the tool. For a fluid of given density, as the flow rate increases, the float is raised further in the tube. The counting rate in the upper detector increases as the float, which contains a radioactive source, moves closer. Conversely, the counting rate in the lower detector decreases as the float moves away. Through the use of the foregoing radioactive source and two detector system. the relative position of the float can be determined from the ratio of detector count rates. For a given flow rate, thus float position, the counting rates recorded from each detector are a function of the density of the fluid. As density increases, counting rate decreases. By calibrating the detectors, fluid density can simultaneously be determined. Knowing float position and fluid density, volume flow rate can be determined.

Flow rates in boreholes are currently measured using technologies such as spinners, vortex flow meters, and pitot meters. The present invention has several advantages over these technologies, in that, it is relatively simple both mechanically and electrically, it is compact and easy to construct, and it has an extremely large dynamic range, especially if the mass and the cross-sectional area of the float are varied by exchanging floats. In addition, fluid density is measured simultaneously with volume flow rate. In oil well production monitoring, fluid density is a key parameter of interest being used to determine relative concentrations of produced water, oil, and gas. In the past, fluid density has been measured with an entirely separate instrument.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 is a system view showing the tool of the present disclosure supported on a logging cable for providing measurements of fluid flow in a cased well borehole wherein the tool is positioned in the well and isolates production with an external packer; and FIG. 2 is a sectional view through the tool of FIG. 1 showing the float located in an upstanding hollow tube.

DETAILED DESCRIPTION OF THE PREFERRED EMBODIMENT

Attention is directed to FIG. 1 of the drawings where the numeral 10 identifies an elongate tubular tool which is lowered in a well borehole to conduct fluid production measurements in accordance with the present disclosure. The sonde 10 is an elongate housing having ports or openings as will be described. The sonde 10 is supported on an elongate logging cable 12 which extends to the surface where it passes over a sheave 14. The cable is spooled or reeled on a supply drum 16. The output signal of one or more conductors in the cable is provided to a CPU 18, and the data are presented for recording by a recorder 20. The data that is obtained are preferably measured relative to a particular depth in the well and to that end, an electrical or mechanical depth measuring device 22 provides a signal for the recorder resulting from operation of the sheave 14. If the tool is operated while moving in the well bore, the linear velocity of the tool is obtained from an electrical or mechanical line speed measuring device 23 which provides a signal for recorder 21 resulting from the operation of the sheave 14.

The well 24 is typically lined with a casing 26. The casing extends to some suitable depth. Typically, the well will produce a flow of fluid which is ideally oil, but which is sometimes mixed with salt water, occasionally with fresh water, and may also include entrained gas bubbles. The degree of entrainment is a function of the conditions of the well including the depth of the formation, formation pressure drive, and many other factors not important to the present disclosure. It is sufficient to note that the produced fluid has a specific density, indicative of the oil/water/gas content, as it flows through the tool of the present disclosure.

The apparatus of this disclosure is constructed in the tool at 10 which further may include an external packer 30 which is inflated for sealing against the surrounding casing in the well 24. The packer 30 is controlled by signals from the surface so that the packer expands, plugging the well, forcing all fluid to flow through the tool. The packer 30 is located in the central portions of the elongate body. The flow path which is through the tool thus requires inlet ports below the packer 30 and outlet ports above the packer. This will be described below.

At the lower portions of the device, there is a radiation detector 32 which is sometimes called the detector $D_1$ hereinafter. This is located at a specific portion of the housing and is preferably a spaced distance y from the beginning of the tube. Dimensions of the tube and the ports will be given below. The detector 32 is similar to another detector 34 which is at the upper end of the tool. This again is known as the detector $D_2$. The detectors 32 and 34 are preferably similar in construction and differ primarily in their location. They are both responsive to the radiation source 36. This is an encapsulated pellet of radioactive material. The preferred form is a radioactive isotope 137 of cesium. Alternate radioactive gamma ray sources are any gamma ray emitting isotope with sufficiently energetic radiation and sufficiently long half life. Cobalt 60 would be an alternate source. It is important that the detectors 32 and 34 respond to radiation from the source 36. This radiation source is preferably unique so that it can be distinguished from the background radiation that exists in the particular well 24 in which the apparatus is used. Background radiation may be nil, or it may be fairly specific depending on the nature of the formations penetrated by the well 24. In either situation, it is desirable to assure that the background radiation does not mask the data by providing unwanted counts to the detectors 32 and 34 which might create ambiguities in the measurements to be described below.

The present device utilizes an elongate hollow structural housing. There are multiple inlet ports 40 at or near the bottom. They are located so that fluid flow is directed upwardly through the tool and out into the annular space above the packer 30. The outlet ports 42 deliver the fluid back to the annular space around the tool. A lengthwise tube 44 is included between the ports so that all the fluid flowing through the system must flow through the tube 44.

The tube 44 has a bottom internal stop or lip 46. This lip confines a float and prevents the escape of the float out the bottom of the tube. In similar fashion, there is a lip 48 at the upper end which limits upward travel of the float. The float 50 is thus captured for movement in the tube between the two facing lips or shoulders so that escape of the float is prevented. The float 50 is a body captured in the tube which rises with fluid flow. It is lifted by fluid flow. As shown better in FIG. 2 of the drawings, it is aligned so that it does not tumble or rotate. Several fingers 52 extend radially outwardly, therebeing a top set and another set at the bottom, the two sets of fingers 52 preventing tumbling of the float, and thereby assuring that the float is maintained in alignment with the detectors 32 and 34.

The radiation source 36 placed in the float is capable of emitting radiation in all directions. The detectors are capable of detecting irradiation from all directions. Limitations are achieved by placing appropriate shields 54, 56 and 58 at or around the two detectors and float respectively. As shown in the drawings, the shielding is located so that radiation is directed primarily toward the two detectors. This cuts down on lateral emission of radiation.

Certain definitions are needed to develop the relationships appropriate for determination of fluid flow rate by the rate meter in the sonde 10. As mentioned earlier, the distance y is the spacing from the detector 32 to the bottom most position which can be achieved by the float. In other words, the distance y measures the spacing between the detector 32 and the shoulder or lip 46 which prevents downward travel of the float. The distance x is variable while the distance y is fixed. Once the device is built, the distance y is fixed while x is a variable distance which is always equal to or greater than y. It is the distance between the radiation source 36, which is treated as a point source, and the detector 32. The distance 1 is the spacing between the detectors 32 and 34 and is also a fixed length. As will be understood, x can never be as small as y and never can be as large as 1. In both instances, the finite height of the float 50 is a factor contributing to these limits on the distance x.

Going momentarily to FIG. 2 of the drawings, the flow area is in the annular space on the exterior of the float 50. It is a function of the tube diameter or $D_t$, and is further dependent on the float diameter or $D_f$.

The float is a composite body and has a weight W. It can be modified by changing the amount of shielding, or using an alternate buoyant material. In addition, the fluid flowing through the device has a fluid density in $cm^3/gm$ or $\rho$. Density of the borehole fluid is contrasted with the density of the float which is $\rho_f$. A coefficient $\mu$ is the gamma ray attenuation coefficient. Another factor is fluid viscosity which is V. Fluid volume flow rate is given by q while the two detectors provide count rates $C_1$ and $C_2$ for the first and second detectors respectively.

PRINCIPLES OF OPERATION

In the publication Transactions of American Society of Mechanical Engineers, volume 76, pages 851-862 (1954), Head provided a relationship for volume flow rate of fluid through a device of this nature which equation 1 is given below.

$$q = F(D_t, D_F, W, \rho_F, V)(x - y)D_F \sqrt{\frac{W(\rho_F - \rho)}{\rho \rho_F}} \quad (1)$$

In equation 1, the first factor given by $F(D_t, D_F, W, \rho_F, V)$ is a relationship which, in part, results from the rotameter design. As a generalization, $D_t$, $D_F$, W and $\rho_F$ are fixed for a particular tool construction. At most, there is some variation in fluid viscosity V. The tool can be constructed so that F is a very weak function of V and a value of V can be assumed with negligible error. This is discussed by Bard and Chesma, Canadian Journal of Chemical Engineering, volume 47, pages 226-232 (1969). F is, therefore, a calibration constant. The term $D_F$ is also fixed for a particular tool construction. Therefore, all terms on the right hand side of equation 1 are fixed except for $\rho$ and x. The flow rate q can therefore be obtained from equation 1 by determining x and ρ.

Equations 2 and 3 are well known to those skilled in the art and relate count rates of the detectors 32 and 34, $C_1$ and $C_2$ respectively, to the formation density ρ:

$$C_1 = K_1 e^{-\mu\rho x} \quad (2)$$

$$C_2 = K_2 e^{-\mu\rho(1-x)} \quad (3)$$

Where μ is the gamma ray linear attenuation coefficient.

In the foregoing equations, the constants $K_1$ and $K_2$ are simply calibration constants. If equations 2 and 3 are solved for density of the borehole fluid, one then obtains equation 4

$$\rho = \frac{\ln\left[\frac{K_2 C_1}{K_1 C_2}\right]}{\mu l} \quad (4)$$

All the terms on the right of equation 4 are either measured or known from calibration, or result from tool design aspects. It must be noted that the gamma ray attenuation coefficient μ is fairly well independent of the nature of the fluid in the tool assuming that the gamma ray source is the preferred cesium source. In some instances, alternate sources might show a relationship between the energy of the radiation and the type of fluid passing through the tool. In any event, assuming that density is obtained from equation 4 above, equation 2 can be rearranged to solve for the variable distance x in equation 5.

$$x = \frac{\ln\left[\frac{K_1}{C_1}\right]}{\mu\rho} \quad (5)$$

After solving equation 4, equation 5 can then be solved because all the terms on the right are again either measured or otherwise known. Once x is known, the distance of x-y, used in equation 1, can easily be determined. This then permits equation 1 to be solved. In the instance that the flow is multiphase, i.e., bubbles of gas, water and oil, a composite is measured.

The data which are provided through the logging cable are primarily the count rates $C_1$ and $C_2$. To this end, the sonde 10 must enclose and include appropriate analog to digital converters, telemetry equipment and line driver amplifiers. Accordingly, relatively simple data is output to the CPU 18.

In the illustrated operation, the sonde 10 is anchored at a particular elevation or depth in the well by the packer 30. This directs all the fluid upwardly through the tool. Flow is continued for a specified interval, and is measured by obtaining count rates from the two detectors 32 and 34. If the flow rate is approximately steady, and assuming a single phase fluid, data can be obtained fairly quickly. If flow is steady, the flow rate can be extended over a period of time to obtain the total volumetric production.

While the foregoing is directed to the preferred embodiment, the scope thereof is determined by the claims which follow.

What is claimed is:

1. A method of measuring fluid flow in a well borehole which comprises the steps of:
   (a) directing the fluid flow in a well upwardly through a tube having upper and lower ends wherein the tube is vertically positioned in the well borehole;
   (b) positioning a float in the tube wherein the float allows flow thereby within the tube;
   (c) positioning a radioactive source within the float;
   (d) positioning spaced lower and upper detectors near the ends of the tube;
   (e) with said detectors, dynamically detecting the position of the float relative to the detectors;
   (f) determining the volume flow rate of fluid flowing through the tube as a function of float position in the tube; and
   (g) determining simultaneously the density of the fluid.

2. The method of claim 1 wherein the flow tube is located in an elongate cylindrical sonde housing, and including inlet and outlet ports spaced along the sonde for directing well fluid flow into the flow tube.

3. The method of claim 2 including the step of blocking fluid flow along the exterior of the sonde by expanding a packer within the well borehole and on the exterior of the sonde.

4. The method of claim 1 including the step of forming upper and lower limit shoulders within said tube so that the float may travel within limits established thereby.

5. The method of claim 2 wherein the step of positioning a radioactive source within the float and measuring radioactivity count rates at the location of said upper and lower detectors including forming a ratio thereof.

6. The method of claim 1 including the step of determining the mass volume flow rate of fluid flowing through the tube for a single phase fluid.

7. The method of claim 1 including the step of positioning outwardly extending means attached to said float to maintain said float in an upright and aligned position relative to the tube so that the float is able to rise and fall but is prevented from changing alignment relative thereto.

8. The method of claim 1 including the step of measuring the radiation intensity at the detectors and correlating float location as a function of count rate.

9. A method of measuring fluid flow rate in a well borehole wherein the method comprises the steps of:
   (a) directing the fluid flow through a tube vertically positioned in the well borehole and supported by a sonde thereat and wherein the tube has a lower end which receives all the fluid flow of the well borehole thereinto for the tube and an upper end outlet for returning the fluid to the well borehole;
   (b) positioning a float within the tube wherein the float is buoyantly lifted by the flow in the tube and placing in said float a signal emitting source;
   (c) positioning a float position detector comprising two separate detectors positioned at opposite ends of said tube each of which is capable of detecting signals from said signal emitting source to determine the position of the float within the tube; and
   (d) determining the volume flow rate of fluid flowing through the tube as a function of float position.

10. The method of claim 9 including the step of blocking all fluid flow in the well borehole by expanding a packer to direct flow into the tube, and directing the fluid flow upwardly through the tube, and also limiting float movement in the tube by forming upper and lower float engaging means to limit float travel.

11. The method of claim 9 including the step of measuring float diameter and tube diameter and determining net tube area as a function of such measurements.

12. A method of measuring fluid flow in a well borehole which comprises the steps of:
- (a) directing the fluid flow in a well upwardly through a tube having upper and lower ends wherein the tube is vertically positioned in the well borehole;
- (b) positioning a float in the tube wherein the float allows flow thereby within the tube;
- (c) positioning spaced lower and upper detectors near the ends of the tube;
- (d) with said detectors, dynamically detecting the position of the float relative to the detectors; and
- (e) determining the volume flow rate of fluid flowing through the tube as a function of float position in the tube.

13. The method of claim 12 including the step of measuring radioactive radiation at the detectors and placing a radioactive source at the float so that radiation therefrom can be measured at the detectors.

14. The method of claim 13 including the step of shielding the source on the float to limit radiation direction.

* * * * *